H. LOEBL.
GUEST CHECK FOR HOTELS.
APPLICATION FILED MAR. 30, 1907. RENEWED MAY 24, 1909.

946,378.

Patented Jan. 11, 1910.

Witnesses:
Raphaël Netter
V. Braun

Hugo Loebl Inventor
By his Attorneys Schuster
and Mathews

H. LOEBL.
GUEST CHECK FOR HOTELS.
APPLICATION FILED MAR. 30, 1907. RENEWED MAY 24, 1909.

946,378.

Patented Jan. 11, 1910.

3 SHEETS—SHEET 2.

Fig. 2.

| 139 | 140 | 141 | 142 | 143 | 144 | 145 | 146 | 147 | 148 |

HOTEL YORK — MARCH 28th 1907

HOTEL YORK
TABLE | WAITER
PERSONS | 145
DATE

Cold tongue — 75 | 75
Lettuce — 35 | 35
Sautern
Garcia

A f

CHECK 32

HOTEL YORK | AMOUNT C | TABLE | PERSONS 145 | DATE
WAITER 145

| 149 | | | | | | | 155 | 156 | 157 | 158 |

Witnesses:
Raphaël Netter
V. Braun.

Hugo Loebl, Inventor
By his Attorneys Schreiter and Mathews

H. LOEBL.
GUEST CHECK FOR HOTELS.
APPLICATION FILED MAR. 30, 1907. RENEWED MAY 24, 1909.

946,378.

Patented Jan. 11, 1910.

3 SHEETS—SHEET 3.

Fig. 3.

HOTEL YORK

MARCH 28th 1907

| 139 | 140 | 141 | 142 | 143 | 144 | 145 | 146 | 147 | 148 |

HOTEL YORK — TABLE / PERSONS 145 / DATE — WAITER

| Cold tongue | 75 | | 75 |
| Lettuce | 35 | | 35 |
| Sautern | 60 | 60 | 60 |
| Garcia | 25 | 25 | 25 |

CHECK 32
HOTEL YORK — AMOUNT — TABLE / PERSONS 145 / DATE
WAITER 145

| 155 | 156 | 157 | 158 |

Witnesses:
Raphael Ketter
V. Braun

Hugo Loebl
Inventor

By his Attorneys Schreiter and Markwort

UNITED STATES PATENT OFFICE.

HUGO LOEBL, OF NEW YORK, N. Y., ASSIGNOR TO KUHN CHECKING SYSTEM CO., OF NEW YORK, N. Y., A CORPORATION OF NEW YORK.

GUEST-CHECK FOR HOTELS.

946,378.     Specification of Letters Patent.    Patented Jan. 11, 1910.

Application filed March 30, 1907, Serial No. 365,524. Renewed May 24, 1909. Serial No. 498,074.

*To all whom it may concern:*

Be it known that I, HUGO LOEBL, of the city, county, and State of New York, have invented certain new and useful Improvements in Guest-Checks for Hotels, of which the following is a full, clear, and complete specification, reference being had to the accompanying drawings, wherein—

Figure 1 is a plan view of a guest check for hotels, made according to my invention; Fig. 1ª is a view of the lower edge of the check, showing the indentures, to facilitate folding the check. Fig. 2 a plan view, showing the check folded and laid on the control sheet in position for stamping thereon, and simultaneously on the control sheet, a charge for a food order, and Fig. 3 a plan view, showing the check folded and laid on the control sheet in position for stamping thereon, and simultaneously also on the bar coupon and on the control sheet of a charge for a bar order.

My invention relates to devices for controlling the distribution of, and the proper entry of charges for articles of food, wine, cigars and the like, consumed by guests in hotels, and the invention consists particularly in the devising of the form of a guest check and in the combining therewith of the bar coupons in such manner that the charges to be entered thereon may be stamped, simultaneously in the charging column of the check and in the waiter's column on the control sheet, and also on the bar coupons, when such coupons are required to be used.

My improved guest check for dies consists of the main portion or body thereof, marked A, and of stubs or coupons B, B', B², B³, etc., (thereafter referred to as "bar-coupons") produced integral with the body A, but divided therefrom by perforations indicated on line $a$, and from each other by perforations indicated on lines $b$. In addition thereto a stub or coupon marked C, is provided at the lower end of the body A, of the check, and divided therefrom by perforations indicated on line $c$. This stub or coupon C is however, not essential to the practicing of my invention or to attaining of its advantages, in the use of the check and forms no part of my invention.

On the main body A of the guest check, are ruled or printed the columns as are usually provided on such checks, and the name of the establishment (" Hotel York ") where the check is used, the number of the check (32) and the number of the waiter (145) using the check. The column (designated "$f$" in the drawings) for entry of the charges is located at the right hand edge of the main body A of the check, to the left of, and immediately adjoining the, perforated line $a$. The stubs or coupons B are also provided with rulings, forming a column for entry of charges thereon, located on their left hand edge, to the right of, and also immediately adjoining the, perforated line $a$. Each of the stubs or coupons B contains also the name of the establishment, the number of the check and the number of the waiter. Along the line $z$ bounding the charging column of the stubs or coupons B, B', B², etc. there is made an incision or indenture to facilitate the folding of the check on this line, as shown in Fig. 3, and a similar incision or indenture $a'$ is made along the perforated line $a$, so that the check may readily be folded on either the line $a$ or $z$, as in the transaction of the business may be required.

It is usual to employ in connection with such guest checks a waiter's ledger, also known as waiter's charging or control sheet. This is a sheet divided by suitable rulings into a number of columns, designated by the numbers of the waiters serving in that establishment, one column for each waiter, and the practice is that the charges for the several articles called for by the order of a guest, are entered on the guest's check and also on the control sheet in the column of the waiter serving the order. It is well known that the largest volume of the so-called dining room business in any hotel is crowded into a comparatively short period of time, during the usual meal hours, and thus it happens, that in spite of the greatest possible care, the checker attending to the entering of the charges, errs quite frequently, sometimes stamping the charge in the wrong column on the control sheet, sometimes entering the charge twice in the same column, and again at times omitting to enter the charge in the column of the control sheet or on the guest check. These errors happen more frequently in entering charges for orders requiring the use of bar-coupons (also termed " duplicate checks ") whereon these charges must be entered in addition to the entry in the main body of the check and on the control sheet.

The object of my invention is to eliminate the possibility of making this error and also to facilitate a more rapid disposition of the business.

To this end, I have devised the check heretofore described and illustrated in Fig. 1 of the drawings. For more rapid disposition of the business, duplicate and triplicate printing dies are used in connection with this check and the control sheet. These dies have the figures, indicating the charges, engraved twice and three times in alinement, so that the charges are printed twice or three times with one impression of the die, as may be required. While these duplicate or triplicate dies do facilitate greatly a more rapid disposition of the business, they are not essential to the use of my improved check. The entries of the charges thereon and on the control sheet may as well be made by means of single printing dies or of pen and ink.

My improved guest check for hotels is used in connection with the above described control sheet, as shown in Figs. 2 and 3 of the drawings, in the following manner:— Supposing that the order of a guest calls for two items of food, a bottle of wine and a cigar and that the charges are respectively as follows:—seventy-five and thirty-five cents for the two items of food, sixty cents for a bottle of wine and twenty-five cents for the cigar. The charges for the two articles of food are to be entered twice, once in the main body of the check and once in the column number 145, of the control sheet, which is the number of the waiter serving the order. To make the entries the checker will fold the check on the perforated line $a$, as shown in Fig. 2 and lay down the check with the folded line along the column number 145 on the control sheet, and then stamp the charges one after the other and each simultaneously by one action, once in the charging column of the check and once in the column number 145 of the control sheet. If the checker be using single dies only, he will have to repeat the action of stamping, once in the charging column of the check and once in the column number 145 of the control sheet. In either case however, the possibility of misplacing the entry of the charge on the control sheet, or of omitting one entry, is eliminated. The folding of the check on the line $a$, enables the checker to rapidly and conveniently put the check in alinement in the column number 145 on the control sheet, and it would require a very peculiar circumstance or a very inattentive or careless checker to make such an error. The entry of the next following charge, sixty cents for the bottle of wine, is required to be made thrice, once in the charging column of the check, once in the charging column of the coupon B and once on the control sheet in the column number 145, the number of the waiter serving the check. To accomplish this, the checker folds the check on line $z$, holds the check when thus folded, as shown in Fig. 3 of the drawing, in alinement with column number 145 of the control sheet, and stamps or enters the charges in the same manner as above described, except that while in the first case the charges were stamped in two columns only (or twice), they are now stamped in three columns (or thrice). The entry of the last charge of twenty-five cents for a cigar, in the charging column of the check, on the stub or coupon B′, and in the column number 145 of the control sheet, is accomplished in the same manner as explained with reference to the entry of the charge of sixty cents for the bottle of wine.

It being usual to print the so-called bar charges (for wine and cigars) with ink of different color, there are usually two or three sets of dies each on a different color pad, on the checker's table. It is as well feasible, to have the dies for printing these charges, contain triplicate engravings of the figures, indicating the charges, and if such triplicate stamping dies are used, the entry of the charge is done simultaneously in all three columns, and thus of course every possibility of an error is thereby eliminated. After the entries are made on the stubs or coupons B and B′, as hereinbefore explained, the waiter separates the stubs or coupons and delivers the same at the bar, where he obtains the articles called for by the order.

I claim as my invention:—

A guest check for hotels, consisting of a body or main portion, ruled, as herein shown and described, and having printed thereon the number of the check and the number of the waiter and lines forming a column; a number of stubs or coupons, situated adjoining the column, the coupons being divided from the main body of the check and from each other, by perforations made along the dividing lines, and each having next adjoining the main body of the check parallel lines forming a column, and the number of the check and the number of the waiter printed thereon, the line dividing the coupons from the main body of the check and the line bounding the column on the coupons, being indented to admit of the folding of the check on either line.

HUGO LOEBL.

Witnesses:
R. A. PIPER,
M. A. HELMKE.